(12) United States Patent
Sriadibhatla et al.

(10) Patent No.: US 11,622,106 B2
(45) Date of Patent: Apr. 4, 2023

(54) SUPPORTING MULTIPLE PARTITION SIZES USING A UNIFIED PIXEL INPUT DATA INTERFACE FOR FETCHING REFERENCE PIXELS IN VIDEO ENCODERS

(71) Applicant: Meta Platforms, Inc., Menlo Park, CA (US)

(72) Inventors: Kameswara Kishore Sriadibhatla, Dublin, CA (US); Yunqing Chen, Los Altos, CA (US); Prasanth Jampani, Newark, CA (US); Srikanth Alaparthi, Fremont, CA (US); Adrian Stafford Lewis, Mountain View, CA (US); Shiyan Pan, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/322,668

(22) Filed: May 17, 2021

(65) Prior Publication Data
US 2022/0368887 A1 Nov. 17, 2022

(51) Int. Cl.
*H04N 19/105* (2014.01)
*H04N 19/176* (2014.01)
*H04N 19/132* (2014.01)
*H04N 19/119* (2014.01)

(52) U.S. Cl.
CPC ......... *H04N 19/105* (2014.11); *H04N 19/119* (2014.11); *H04N 19/132* (2014.11); *H04N 19/176* (2014.11)

(58) Field of Classification Search
CPC .. H04N 19/176; H04N 19/593; H04N 19/159; H04N 19/119; H04N 19/61; H04N 19/12; H04N 19/172; H04N 19/157; H04N 19/103
See application file for complete search history.

(56) References Cited

U.S. PATENT DOCUMENTS 9,807,399 B2   10/2017   Wang
10,986,349 B2*   4/2021   Zhou .................... H04N 19/139
(Continued)

OTHER PUBLICATIONS

Chris, Machine Learning Explained, Machine Learning Tutorials, Machinecurve, What is Padding in a Neural Network, Feb. 7, 2020.
(Continued)

*Primary Examiner* — Daniel Chang
(74) *Attorney, Agent, or Firm* — Van Pelt, Yi & James LLP

(57) ABSTRACT

The controller is configured to receive a request that causes transferring of a reference pixel block of a video, wherein the video is being encoded using the reference pixel block. The controller is configured to determine whether the reference pixel block has at least a portion that is outside a frame of the video. In response to the determination of the reference pixel block having at least a portion outside the frame of the video, the controller is configured to cause a portion of the reference pixel block of the video inside the frame of the video to be fetched from a memory storage and stored in a cache storage, pad a remaining missing portion of the reference pixel block of the video outside the frame of the video with padding pixel data to form the reference pixel block, and transfer the reference pixel block in response to the request.

20 Claims, 9 Drawing Sheets

(56) References Cited

U.S. PATENT DOCUMENTS

| | | | |
|---|---|---|---|
| 2002/0065952 A1* | 5/2002 | Sullivan | H04N 19/577 |
| | | | 375/E7.184 |
| 2008/0025398 A1 | 1/2008 | Molloy et al. | |
| 2011/0032995 A1* | 2/2011 | Chua | H04N 19/523 |
| | | | 375/240.24 |
| 2011/0122950 A1* | 5/2011 | Ji | H04N 19/51 |
| | | | 375/E7.243 |
| 2012/0155540 A1* | 6/2012 | Jagannathan | H04N 19/176 |
| | | | 375/E7.125 |
| 2013/0128974 A1* | 5/2013 | Chien | H04N 19/17 |
| | | | 375/240.15 |
| 2013/0272410 A1* | 10/2013 | Seregin | H04N 19/52 |
| | | | 375/240.16 |
| 2017/0041625 A1 | 2/2017 | Bates et al. | |
| 2017/0272765 A1* | 9/2017 | Wang | H04N 19/61 |
| 2019/0156185 A1* | 5/2019 | Li | G06N 3/082 |
| 2019/0208217 A1* | 7/2019 | Zhou | H04N 19/103 |
| 2021/0281876 A1* | 9/2021 | Zhang | H04N 19/176 |
| 2021/0297679 A1* | 9/2021 | Zhang | H04N 19/117 |
| 2021/0385476 A1* | 12/2021 | Xu | H04N 19/43 |
| 2022/0070449 A1* | 3/2022 | Zhao | H04N 19/159 |

OTHER PUBLICATIONS

Jasmina Vasiljevic, Ryerson University, Digital Commons @ Ryerson, Theses and Dissertations, Analysis and Architecture Design of Scalable Fractional Motion Estimation for H.264 Encoding, Jan. 1, 2011.

Li et al., Memory Cache Based Motion Compensation Architecture for HDTV H.264/AVC Decoder, IEEE International Symposium on Circuits and Systems, May 30, 2007.

International Search Report and Written Opinion for International Application No. PCT/US2022/029345, dated Sep. 20, 2022, 13 pages.

Sullivan G.J., et al., "Methods of Reduced-Complexity Overlapped Block Motion Compensation," Proceedings of the Internationalconference On Image Processing (ICIP), Nov. 13, 1994, pp. 957-961.

* cited by examiner

| Original Pixel Block Size | Original Pixel Block + Extra Pixels for Interpolation | Split Pixel Blocks Processing Order | No of Split Requests |
|---|---|---|---|
| 16x16 | 24x24 | 24x24 | 1 |
| 16x32 | 24x40 | 24x40 | 1 |
| 32x16 | 40x24 | 24x24(1)->24x24(2) | 2 |
| 32x32 | 40x40 | 24x40(1)->24x40(2) | 2 |
| 32x64 | 40x72 | 24x72(1)->24x72(2) | 2 |
| 64x32 | 72x40 | 24x40(1)->24x40(2)->24x40(3)->24x40(4) | 4 |
| 64x64 | 72x72 | 24x72(1)->24x72(2)->24x72(3)->24x72(4) | 4 |

| REQ_FIELD_NAME | Description |
|---|---|
| START_X | Search Read Block top-left corner pixel X coordinate |
| START_Y | Search Read Block top-left corner pixel Y coordinate |
| WIDTH | Search Read Block width |
| HEIGHT | Search Read Block height |
| VERT_SPLIT_SIZE | Vertical split size (could be 8,16,32 etc.depending on the specific client requirement) |
| REF_ID | Reference frame number for current search read request |

*Fig. 8*

| Original Pixel Block Size | Original Pixel Block + Extra Pixels for Interpolation | Split Pixel Blocks Processing Order | No of Split Requests |
|---|---|---|---|
| 64x64 | 72x72 | 24x40(1)->24x40(2)->24x40(3)->24x40(4)->24x40(5)->24x40(6)->24x40(7)->24x40(8) | 8 |

SUPPORTING MULTIPLE PARTITION SIZES USING A UNIFIED PIXEL INPUT DATA INTERFACE FOR FETCHING REFERENCE PIXELS IN VIDEO ENCODERS

BACKGROUND OF THE INVENTION

A video coding format is a content representation format for storage or transmission of digital video content (such as m a data file or bitstream). It typically uses a standardized video compression algorithm. Examples of video coding formats include H.262 (MPEG-2 Part 2), MPEG-4 Part 2, H.264 (MPEG-4 Part 10), HEVC (H.265), Theora, RealVideo RV40, VP9, and AV1. A video codec is a device or software that provides encoding and decoding for digital video. Most codecs are typically implementations of video coding formats.

Recently, there has been an explosive growth of video usage on the Internet. Some websites (e.g., social media websites or video sharing websites) may have billions of users and each user may upload or download one or more videos each day. When a user uploads a video from a user device onto a website, the website may store the video in one or more different video coding formats, each being compatible with or more efficient for a certain set of applications, hardware, or platforms. Therefore, higher video compression rates are desirable. For example, AV1 offers up to 50% more compression compared to its predecessor. However, with higher compression rates come higher computational complexity; therefore improved hardware architecture and techniques in video coding would be desirable.

BRIEF DESCRIPTION OF THE DRAWINGS

Various embodiments of the invention are disclosed in the following detailed description and the accompanying drawings.

FIG. 7 illustrates a table 700 of examples of transferring reference pixel data from a DRAM memory to a fractional motion estimation (FME) module via a DMA controller using a unified pixel data interface FIG. 8 illustrates one exemplary set of parameters that are specified by the client in table 800.

FIG. 9 illustrates a table 900 showing an example of transferring reference pixel data from a DRAM memory to a motion compensation module via a DMA controller using a unified pixel data interface.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
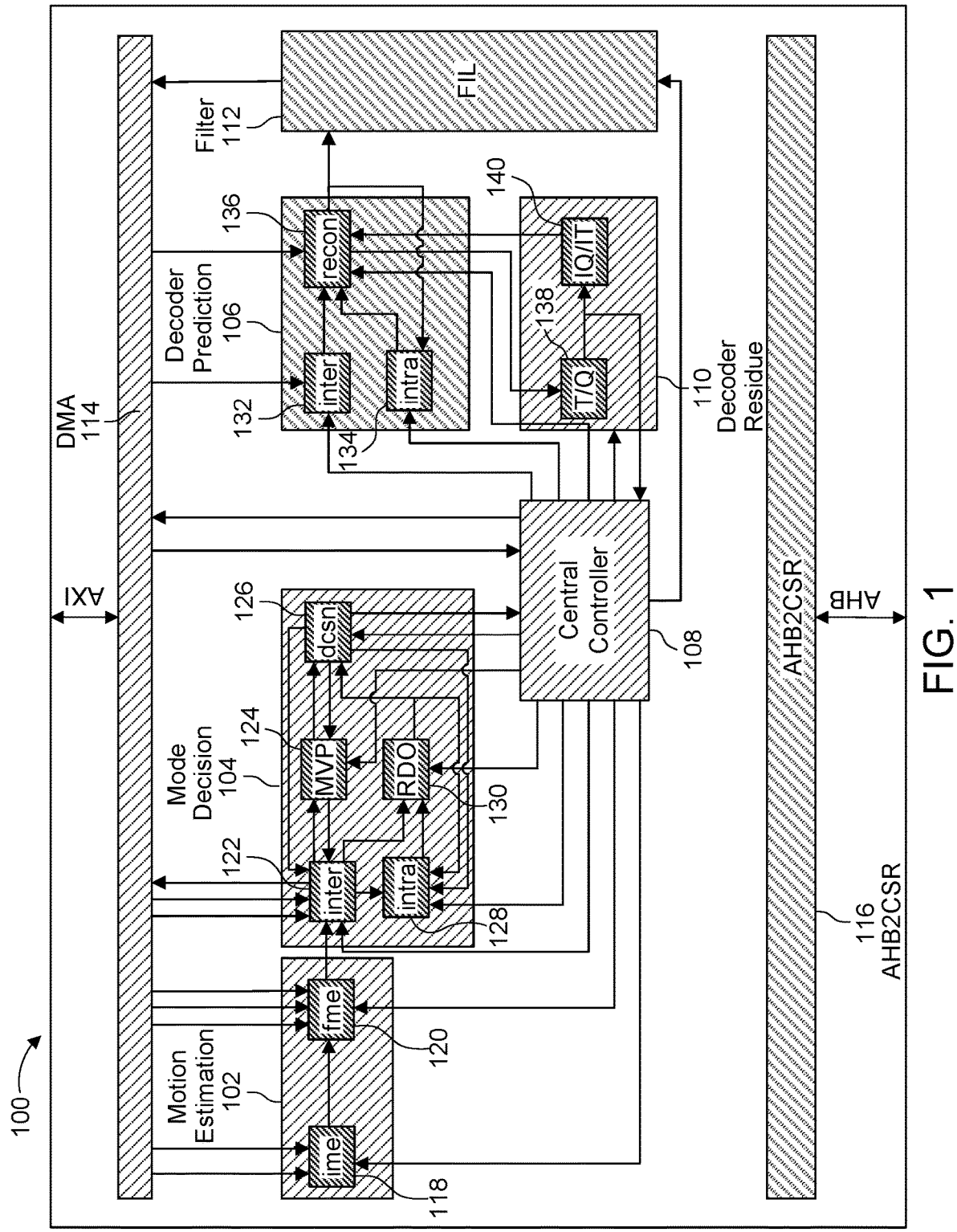
FIG. 1 illustrates a block diagram of an embodiment of a video encoder 100.

FIG. 1 illustrates a block diagram of an embodiment of a video encoder 100. For example, video encoder 100 supports the video coding format AV1 (Alliance for Open Media Video 1). However, video encoder 100 may also support other video coding formats as well, such as H.262 (MPEG-2 Part 2), MPEG-4 Part 2, H.264 (MPEG-4 Part 1.0), HEVC (H.265), Theora, RealVideo RV40, and VP9.

Video encoder 100 includes many modules. Some of the main modules of video encoder 100 are shown in FIG. 1. As shown in FIG. 1, video encoder 100 includes a direct memory access (DMA) controller 114 for transferring video data. Video encoder 100 also includes an AMBA (Advanced Microcontroller Bus Architecture) to CSR (control and status register) module 116. Other main modules include a motion estimation module 102, a mode decision module 104, a decoder prediction module 106, a central controller 108, a decoder residue module 110, and a filter 112.

Video encoder 100 includes a central controller module 108 that controls the different modules of video encoder 100, including motion estimation module 102, mode decision module 104, decoder prediction module 106, decoder residue module 110, filter 112, and DMA controller 114.

Video encoder 100 includes a motion estimation module 102. Motion estimation module 102 includes an integer motion estimation (IME) module 118 and a fractional motion estimation (FME) module 120. Motion estimation module 102 determines motion vectors that describe the transformation from one image to another, for example, from one frame to an adjacent frame. A motion vector is a two-dimensional vector used for inter-frame prediction; it refers the current frame to the reference frame, and its coordinate values provide the coordinate offsets from a location in the current frame to a location in the reference frame. Motion estimation module 102 estimates the best motion vector, which may be used for inter prediction in mode decision module 104. An inter coded frame is divided into blocks, e.g., prediction units or partitions within a macroblock. Instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as a motion vector, which points to the position of the matching block at the reference frame. The process of motion vector determination is called motion estimation.

Video encoder 100 includes a mode decision module 104. The main components of mode decision module 104 include an inter prediction module 122, an intra prediction module 128, a motion vector prediction module 124, a rate-distortion optimization (RDO) module 130, and a decision module 126. Mode decision module 104 detects one prediction mode among a number of candidate inter prediction modes and intra prediction modes that gives the best results for encoding a block of video.

Intra prediction is the process of deriving the prediction value for the current sample using previously decoded sample values in the same decoded frame. Intra prediction exploits spatial redundancy, i.e., correlation among pixels within one frame, by calculating prediction values through extrapolation from already coded pixels for effective delta coding. Inter prediction is the process of deriving the prediction value for the current frame using previously encoded reference frames. Inter prediction exploits temporal redundancy.

Rate-distortion optimization (RDO) is the optimization of the amount of distortion (loss of video quality) against the amount of data required to encode the video, i.e., the rate. RDO module 130 provides a video quality metric that measures both the deviation from the source material and the bit cost for each possible decision outcome. Both inter prediction and intra prediction have different candidate prediction modes, and inter prediction and intra prediction that are performed under different prediction modes may result in final pixels requiring different rates and having different amounts of distortion and other costs.

For example, different prediction modes may use different block sizes for prediction. In some parts of the image there may be a large region that can all be predicted at the same time (e.g., a still background image), while in other parts there may be some fine details that are changing (e.g., in a talking head) and a smaller block size would be appropriate. Therefore, some video coding formats provide the ability to vary the block size to handle a range of prediction sizes. The decoder decodes each image in units of superblocks (e.g., 128×128 or 64×64 pixel superblocks). Each superblock has a partition that specifies how it is to be encoded. Superblocks may be divided into smaller blocks according to different partitioning patterns. This allows superblocks to be divided into partitions as small as 4×4 pixels.

Besides using different block sizes for prediction, different prediction modes may use different settings in inter prediction and intra prediction. For example, there are different inter prediction modes corresponding to using different reference frames, which have different motion vectors. For intra prediction, the intra prediction modes depend on the neighboring pixels, and AV1 uses eight main directional modes, and each allows a supplementary signal to tune the prediction angle in units of 3°. In VP9, the modes include DC, Vertical, Horizontal, TM (True Motion), Horizontal Up, Left Diagonal, Vertical Right, Vertical Left, Right Diagonal, and Horizontal Down.

RDO module 130 receives the output of inter prediction module 122 corresponding to each of the inter prediction modes and determines their corresponding amounts of distortion and rates, which are sent to decision module 126. Similarly, RDO module 130 receives the output of intra prediction module 128 corresponding to each of the intra prediction modes and determines their corresponding amounts of distortion and rates, which are also sent to decision module 126.

In some embodiments, for each prediction mode, inter prediction module 122 or intra prediction module 128 predicts the pixels, and the residual data (i.e., the differences between the original pixels and the predicted pixels) may be sent to RDO module 130, such that RDO module 130 may determine the corresponding amount of distortion and rate. For example, RDO module 130 may estimate the amounts of distortion and rates corresponding to each prediction mode by estimating the final results after additional processing steps (e.g., applying transforms and quantization) are performed on the outputs of inter prediction module 122 and intra prediction module 128.

Decision module 126 evaluates the cost corresponding to each inter prediction mode and intra prediction mode. The cost is based at least in part on the amount of distortion and the rate associated with the particular prediction mode. In some embodiments, the cost (also referred to as rate distortion cost, or RD Cost) may be a linear combination of the amount of distortion and the rate associated with the particular prediction mode; for example, RD Cost=distortion+ λ*rate, where λ is a Lagrangian multiplier. The rate includes different components, including the coefficient rate, mode rate, partition rate, and token cost/probability. Other additional costs may include the cost of sending a motion vector in the bit stream. Decision module 126 selects the best inter prediction mode that has the lowest overall cost among all the inter prediction modes. In addition, decision module 126 selects the best intra prediction mode that has the lowest overall cost among all the intra prediction modes. Decision module 126 then selects the best prediction mode (intra or inter) that has the lowest overall cost among all the prediction modes. The selected prediction mode is the best mode detected by mode decision module 104.

After the best prediction mode is selected by mode decision module 104, the selected best prediction mode is sent to central controller 108. Central controller 108 controls decoder prediction module 106, decoder residue module 110, and filter 112 to perform a number of steps using the mode selected by mode decision module 104. This generates the inputs to an entropy coder that generates the final bitstream. Decoder prediction module 106 includes an inter prediction module 132, an intra prediction module 134, and a reconstruction module 136. If the selected mode is an inter prediction mode, then the inter prediction module 132 is used to do the inter prediction, whereas if the selected mode is an intra prediction mode, then the intra prediction module 134 is used to do the intra prediction. Decoder residue module 110 includes a transform and quantization module (T/Q) 138 and an inverse quantization and inverse transform module (IQ/IT) 140.

Inter prediction is a key technique for achieving significant compression gains in video encoding. Inter prediction is the process of deriving the prediction values for the current frame using previously decoded reference frames. Typically, these reference frames are stored in DRAM (Dynamic Random Access Memory), and a fetch engine, such as a DMA (Direct Memory Access), is used to copy the reference frames to a local cache. Multiple clients may request the reference frame data from the cache at various stages of the encoding process. Different video encoding formats may support different sets of partition shapes. For example, H.264 (MPEG-4 Part 10) and VP9 each supports multiple partition shapes. Therefore, a unified pixel data interface that may be used by the clients to fetch the data efficiently from the cache would be desirable.

A system for storing and providing video pixel data for video encoding is disclosed. The system comprises a memory storage and a cache storage. The system further comprises a controller. The controller is configured to receive a request that causes transferring of a reference pixel block of a video, wherein the video is being encoded using the reference pixel block. The controller is configured to determine whether the reference pixel block has at least a portion that is outside a frame of the video. In response to the determination of the reference pixel block having at least a portion outside the frame of the video, the controller is configured to cause a portion of the reference pixel block of the video inside the frame of the video to be fetched from a memory storage and stored in a cache storage, pad a remaining missing portion of the reference pixel block of the video outside the frame of the video with padding pixel data to form the reference pixel block, and transfer the reference pixel block in response to the request.

Figure 2:
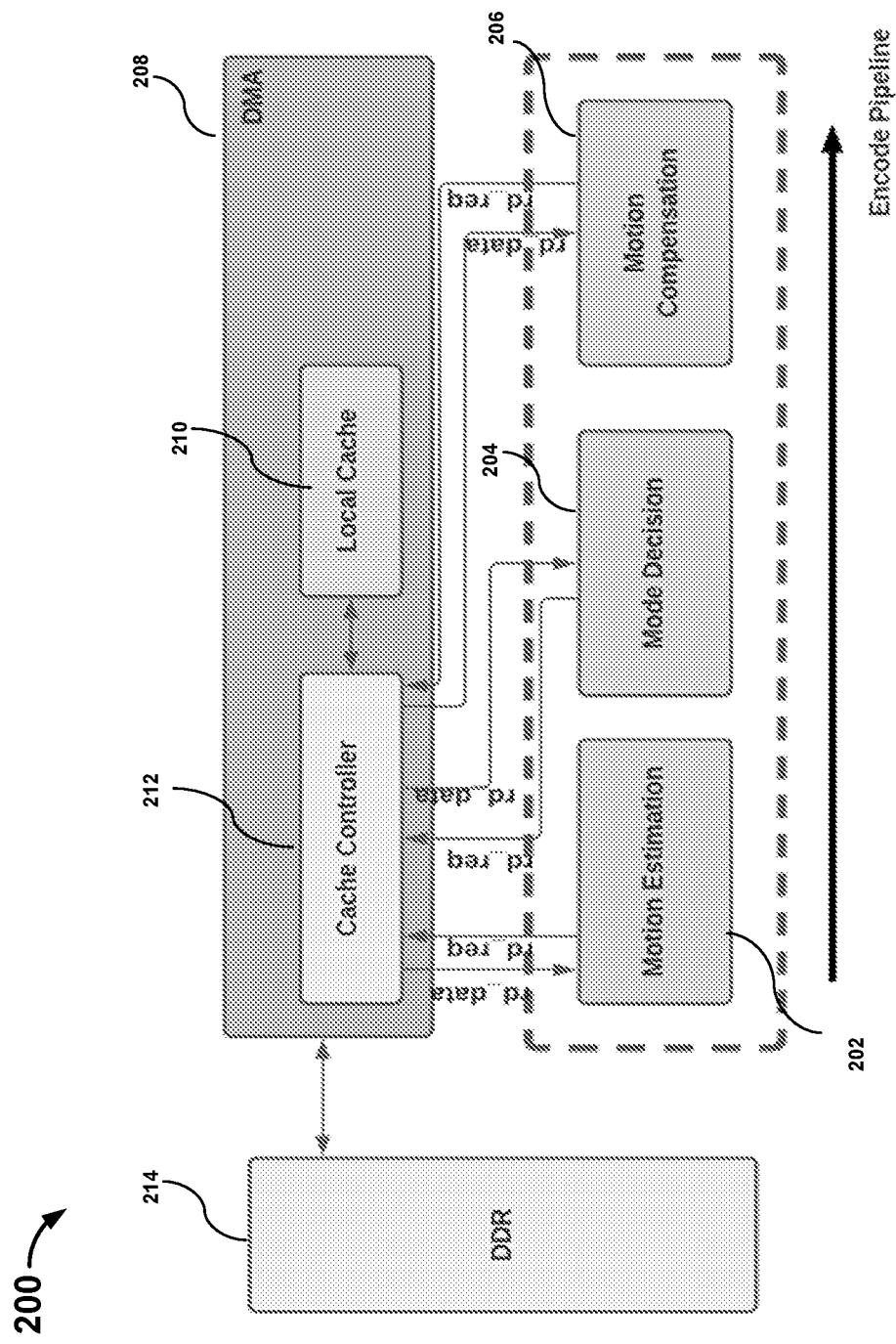
FIG. 2 illustrates an embodiment of a system 200 for storing and providing video pixel data.

FIG. 2 illustrates an embodiment of a system 200 for storing and providing video pixel data. System 200 includes a direct memory access (DMA) controller 208 for transferring video data from one or more DRAM memory modules 214 to different modules of a video encoder. The different modules of the video encoder may include a motion estimation module 202, a mode decision module 204, and a motion compensation module 206. These modules of the video encoder are clients of the DMA controller 208, and these modules may request DMA controller 208 to transfer video data from DRAM memory 214 at various stages of the encoding process. DMA controller 208 includes a reference pixel cache controller 212 and a local cache 210. DRAM memory 214 may be any Double Data Rate Synchronous Dynamic Random-Access Memory (DDR SDRAM) memory, which is a double data rate (DDR) synchronous dynamic random-access memory (SDRAM) class of memory integrated circuits, such as a DDR4 or DDR5 SDRAM memory.

Figure 3:
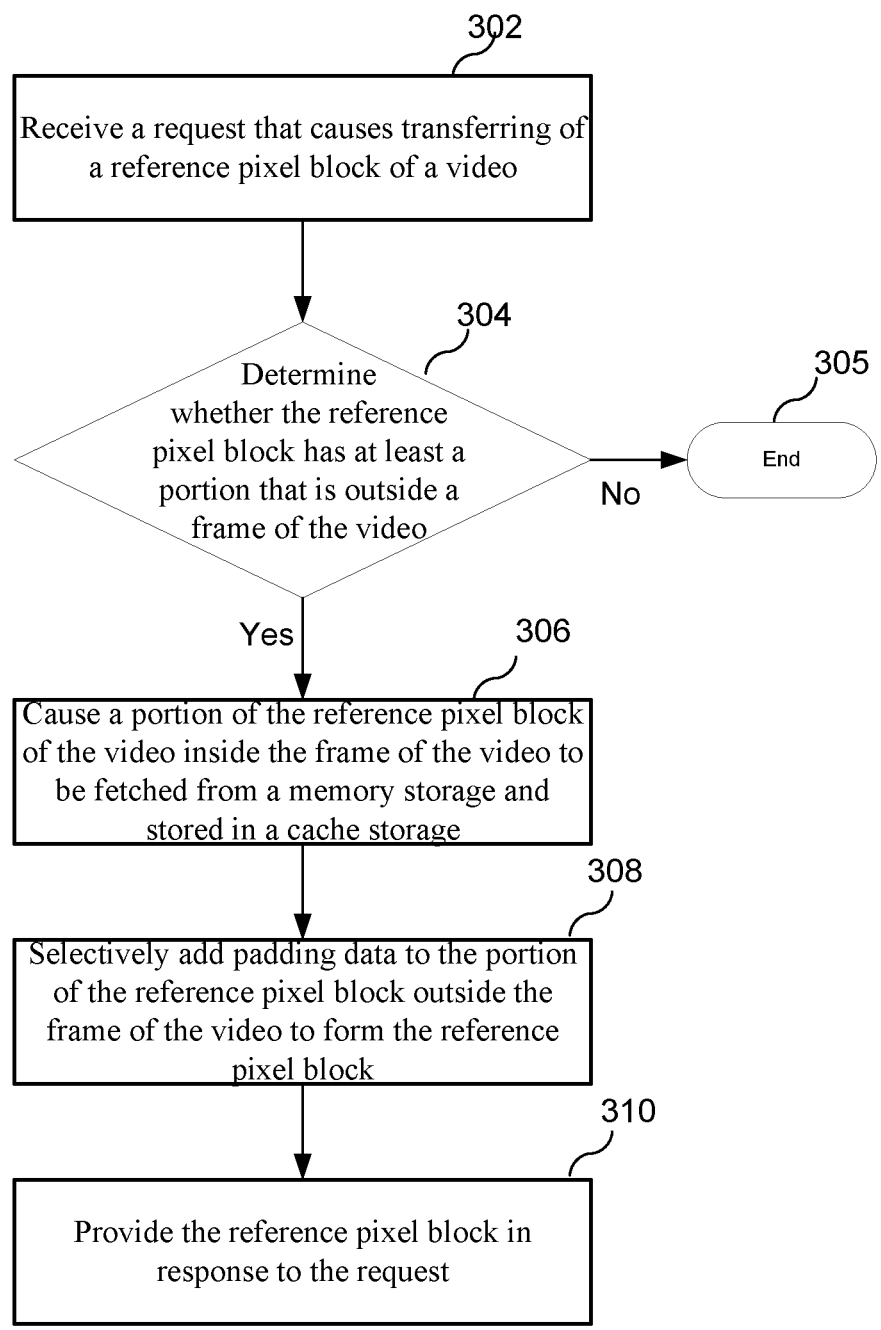
FIG. 3 illustrates an exemplary process 300 for storing and providing video pixel data.

FIG. 3 illustrates an exemplary process 300 for storing and providing video pixel data. In some embodiments, process 300 may be performed by DMA controller 208.

At step 302, a request that causes transferring of a reference pixel block of a video is received, wherein the video is being encoded using the reference pixel block. The reference pixel block is associated with a previously decoded reference frame that is used for inter prediction. As shown in FIG. 2, a read request (indicated in FIG. 2 as rd_req) may be sent by a client of the DMA controller 208 to the DMA controller 208. The client may be one of the modules of the video encoder, including motion estimation module 202, mode decision module 204, and motion compensation module 206. The read request is received by the reference pixel cache controller 212 of DMA controller 208.

Figure 4:
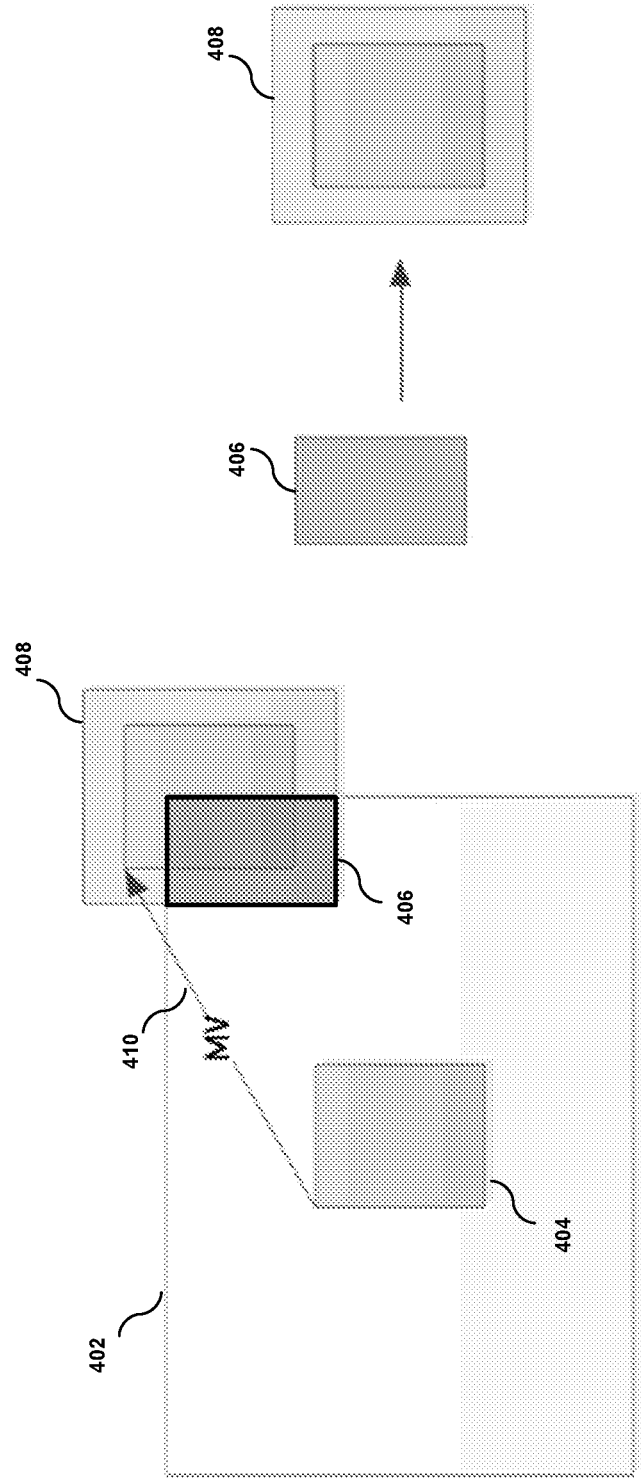
FIG. 4A illustrates an example of a reference pixel block that has at least a portion that is outside a frame of a video.
FIG. 4B illustrates an example of adding padding pixel data to portion 406 of the reference pixel block 408 of the video that is inside the video frame to form the reference pixel block 408, which is larger in size than portion 406.

At step 304, whether the reference pixel block has at least a portion that is outside a frame of the video is determined. FIG. 4A illustrates an example of a reference pixel block that has at least a portion that is outside a frame of a video. Source block 404 is a block of pixels in a current video frame 402. For example, source block 404 may be a 16×16 pixel block. The reference pixel block 408 that is needed for inter prediction is 24×24 pixels in size. A motion vector 410 corresponding to source block 404 and the reference pixel block 408 is shown connecting the two blocks. In this example, a portion 406 of the reference pixel block 408 is inside its video frame, whereas the remaining portion of the reference pixel block 408 is outside its video frame. Since the reference pixel block has at least a portion that is outside a frame of the video, process 300 proceeds to step 306; otherwise, process 300 proceeds to step 305 and exits.

At step 306, in response to the determination of the reference pixel block having at least a portion outside the frame of the video, a portion of the reference pixel block of the video inside the frame of the video is caused to be fetched from a memory storage and stored in a cache storage. For example, portion 406 of the reference pixel block 408 that is inside the video frame is fetched from DDR memory 214 and stored in local cache 210.

At step 308, a remaining portion of the reference pixel block of the video outside the frame of the video is padded with padding pixel data to form the reference pixel block. FIG. 4B illustrates an example of adding padding pixel data to portion 406 of the reference pixel block 408 that is inside the video frame to form the reference pixel block 408, which is larger in size than portion 406. In some embodiments, the formed reference pixel block 408 may be stored in a local buffer in reference pixel cache controller 212. The missing pixels are padded by reference pixel cache controller 212 before the reference pixel block 408 is sent back to the client. The key advantage is that the padding logic is shared by all the clients.

Figure 5:
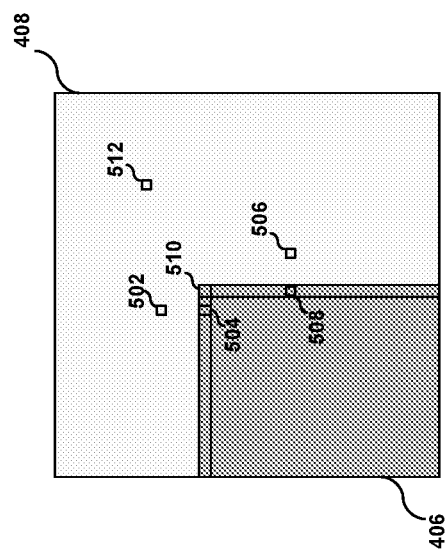
FIG. 5 illustrates that the padding pixel value at a particular pixel location is based on the pixel value of a closest pixel within the portion of the reference pixel block of the video inside the frame of the video.

The padding pixel values are determined based on the positions of the missing pixels relative to the portion of the reference pixel block of the video inside the frame of the video. FIG. 5 illustrates that the padding pixel value at a particular pixel location is based on the pixel value of a closest pixel within the portion of the reference pixel block of the video inside the frame of the video.

If a missing pixel is above the video frame, then the missing pixel is padded with the pixel value of a pixel that is in the portion of the reference pixel block inside the frame and is directly below it and on the first line of the frame. For example, with reference to FIG. 5, a missing pixel 502 above the video frame is padded with the pixel value of the pixel 504 that is in portion 406 and directly below missing pixel 502 and on the first top line of portion 406. In other words, for top padding, the missing pixels replicate the first line pixels.

If a missing pixel is to the right of the video frame, then the missing pixel is padded with the pixel value of a pixel that is in the portion of the reference pixel block inside the frame and is the last right-most pixel in that portion on the same horizontal line. For example, with reference to FIG. 5, a missing pixel 506 to the right of the video frame is padded with the pixel value of the pixel 508 that is in portion 406 and is the last right-most pixel on the same horizontal line. In other words, for right padding, the missing pixels replicate the last pixel of the corresponding line.

If a missing pixel is below the video frame, then the missing pixel is padded with the pixel value of a pixel that is in the portion of the reference pixel block inside the frame and is directly above it and on the last line of the frame. In other words, for bottom padding, the missing pixels replicate the last line pixels.

If a missing pixel is to the left of the video frame, then the missing pixel is padded with the pixel value of a pixel that is in the portion of the reference pixel block inside the frame and is the first left-most pixel in that portion on the same horizontal line. In other words, for left padding, the missing pixels replicate the first pixel of the corresponding line.

If a missing pixel is above and to the right of the video frame, then the missing pixel is padded with the pixel value of a pixel that is in the portion of the reference pixel block inside the frame and is the last right-most pixel in that portion on the first line of the frame. For example, with reference to FIG. 5, a missing pixel 512 that is above and to the right of the video frame is padded with the pixel value of the pixel 510 that is in portion 406 and is the last right-most pixel on the first line of the frame.

At step 310, the reference pixel block is provided to the client in response to the client's request. For example, as shown in FIG. 2, the reference pixel block may be sent from the reference pixel cache controller 212 to the client (indicated as rd_data in FIG. 2), which is one of the modules of the video encoder, including motion estimation module 202, mode decision module 204, and motion compensation module 206.

As discussed above, multiple clients may request the reference frame data from the cache at various stages of the encoding process. Different video encoding formats may support different sets of partition shapes. For example, H.264 (MPEG-4 Part 10) and VP9 each supports multiple partition shapes. Therefore, a unified pixel data interface to fetch the data efficiently from the cache is used. As will be described in greater detail below, the width of the unified pixel data interface is selected to optimally support different partition shapes and different video encoding formats.

One of the clients that may request the reference frame data from the DMA controller is the fractional motion estimation (FME) module. A pixel data interface of 24×1 per line in size is selected to support different partition shapes. When processing a block of reference frame pixels, interpolation requires extra samples in addition to the original block of the pixels to be read from DDR memory 214 via DMA controller 208. H.264 uses a 6-tap interpolation, which requires six additional pixels. VP9 uses an 8-tap interpolation, which requires eight additional pixels. Therefore, to process a 16 pixel wide block of pixels, up to eight additional pixels may be needed per line. In other words, 16+8=24 pixels may be needed. Therefore, the pixel data interface is selected to be 24 pixels in width. And a block of pixels that needs to be transferred (e.g., a prediction unit) is divided into smaller block units that are 16 samples wide, such that a smaller block unit together with the additional samples required for interpolation still fit into the 24 pixel wide pixel data interface. In other words, if a prediction unit has a width that is a multiple of 16 pixels, then the prediction unit is divided into multiple block units. Each block unit is 16 pixels in width, and each block unit corresponds to one transfer block, and wherein each line of the transfer block includes 16 pixels of the corresponding unit and additional pixels for interpolation.

Other pixel widths may be used depending on the system requirements. For example, an 8 pixel wide block of pixels may be processed per clock, and up to eight additional pixels may be needed per line. In other words, 8+8=16 pixels may be needed. Therefore, the pixel data interface is selected to be 16 pixels in width. And a block of pixels that needs to be transferred (e.g., a prediction unit) is divided into smaller block units that are 8 samples wide, such that a smaller block unit together with the additional samples required for interpolation still fit into the 16 pixel wide pixel data interface. In other words, if a prediction unit has a width that is a multiple of 8 pixels, then the prediction unit is divided into multiple block units. Each block unit is 8 pixels in width, and each block unit corresponds to one transfer block, and wherein each line of the transfer block includes 8 pixels of the corresponding unit and additional pixels for interpolation. In this embodiment, more cycles are needed to finish the entire super block; however, less area is needed as fewer pixels per clock are processed.

In another example, a 32 pixel wide block of pixels may be processed per clock, and up to eight additional pixels may be needed per line. In other words, 32+8=40 pixels may be needed. Therefore, the pixel data interface is selected to be 40 pixels in width. And a block of pixels that needs to be transferred (e.g., a prediction unit) is divided into smaller block units that are 32 samples wide, such that a smaller block unit together with the additional samples required for interpolation still fit into the 40 pixel wide pixel data interface. In other words, if a prediction unit has a width that is a multiple of 32 pixels, then the prediction unit is divided into multiple block units. Each block unit is 32 pixels in width, and each block unit corresponds to one transfer block, and wherein each line of the transfer block includes 32 pixels of the corresponding unit and additional pixels for interpolation. In this embodiment, fewer cycles are needed to finish the entire super block; however, more area is needed as more pixels per clock are processed.

As shown in the above examples, the transferring of the reference pixel block is divided into a plurality of transfer blocks, wherein each transfer block comprises a width and a height, and wherein the width is a predetermined block unit pixel width plus additional pixels for interpolation. For example, the predetermined block unit pixel width is 16 and the addition pixels for interpolation is 8, and the width is 16+8=24 pixels.

Figure 6:
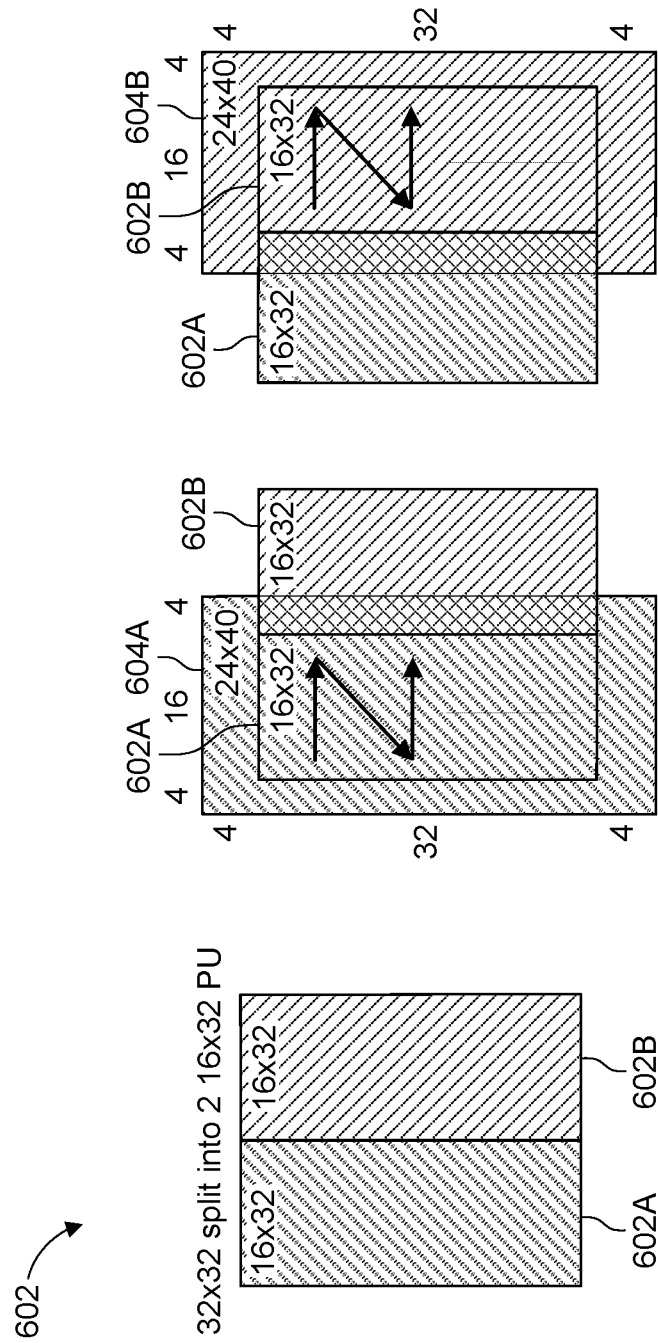
FIG. 6A illustrates that a 32×32 reference pixel block 602 may be divided into two smaller block units of 16×32 reference pixel blocks (602A and 602B).
FIG. 6B illustrates that with an 8-tap interpolation, the left block unit of 16×32 pixel block unit 602A together with the extra pixels for interpolation become a 24×40 pixel transfer block 604A that is transferred by reference pixel cache controller 212 via the 24 pixel wide pixel data interface.
FIG. 6C illustrates that with an 8-tap interpolation, the right block unit of 16×32 pixel block unit 602B together with the extra pixels for interpolation become a 24×40 pixel transfer block 604B that is transferred by reference pixel cache controller 212 via the 24 pixel wide pixel data interface.

FIGS. 6A, 6B, and 6C illustrate an example of transferring reference pixel data from a DRAM memory to a fractional motion estimation (FME) module via a DMA controller using a unified pixel data interface. FIG. 6A illustrates that a 32×32 reference pixel block 602 may be divided into two smaller block units of 16×32 reference pixel blocks (602A and 602B). FIG. 6B illustrates that with an 8-tap interpolation, the left block unit of 16×32 pixel block unit 602A together with the extra pixels for interpolation become a 24×40 pixel transfer block 604A that is transferred by reference pixel cache controller 212 via the 24 pixel wide pixel data interface. FIG. 6C illustrates that with an 8-tap interpolation, the right block unit of 16×32 pixel block unit 602B together with the extra pixels for interpolation become a 24×40 pixel transfer block 604B that is transferred by reference pixel cache controller 212 via the 24 pixel wide pixel data interface. Therefore, an original 32×32 reference pixel block is split into two 24×40 pixel block transfers.

FIG. 7 illustrates a table 700 of examples of transferring reference pixel data from a DRAM memory to a fractional motion estimation (FME) module via a DMA controller using a unified pixel data interface.

As shown in row 1 of table 700, a 16×16 original reference pixel block does not need to be divided into smaller block units. With an 8-tap interpolation, the 16×16 pixel block together with the extra pixels for interpolation become a 24×24 pixel transfer block that is transferred by reference pixel cache controller 212 via the 24 pixel wide pixel data interface. Therefore, an original 16×16 reference pixel block requires one 24×24 pixel block transfer.

As shown in row 2 of table 700, a 16×32 original reference pixel block does not need to be divided into smaller block units. With an 8-tap interpolation, the 16×32 pixel block together with the extra pixels for interpolation become a 24×40 pixel transfer block that is transferred by reference pixel cache controller 212 via the 24 pixel wide pixel data interface. Therefore, an original 16×32 reference pixel block requires one 24×40 pixel block transfer.

As shown in row 3 of table 700, a 32×16 original reference pixel block may be divided into two smaller block units of 16×16 reference pixel blocks. With an 8-tap interpolation, one 16×16 pixel block unit together with the extra pixels for interpolation become a 24×24 pixel transfer block that is transferred by reference pixel cache controller 212 via the 24 pixel wide pixel data interface. With an 8-tap interpolation, the second 16×16 pixel block unit together with the extra pixels for interpolation become a 24×24 pixel transfer block that is transferred by reference pixel cache controller 212 via the 24 pixel wide pixel data interface. Therefore, an original 32×16 reference pixel block is split into two 24×24 pixel block transfers.

Row 4 of table 700 is the same as the example shown in FIGS. 6A, 6B, and 6C. The 32×32 pixel block together with the extra pixels for interpolation become a 40×40 pixel block. The original 32×32 reference pixel block is split into two 24×40 pixel block transfers.

As shown in row 5 of table 700, a 32×64 original reference pixel block may be divided into two smaller 16×64 reference pixel block units. With an 8-tap interpolation, one 16×64 pixel block unit together with the extra pixels for interpolation become a 24×72 pixel transfer block that is transferred by reference pixel cache controller 212 via the 24 pixel wide pixel data interface. With an 8-tap interpolation, the second 16×64 pixel block unit together with the extra pixels for interpolation become a 24×72 pixel transfer block that is transferred by reference pixel cache controller 212 via the 24 pixel wide pixel data interface. Therefore, an original 32×64 reference pixel block is split into two 24×72 pixel block transfers.

As shown in row 6 of table 700, a 64×32 original reference pixel block may be divided into four smaller 16×32 reference pixel block units. With an 8-tap interpolation, each 16×32 pixel block unit together with the extra pixels for interpolation become a 24×40 pixel transfer block that is transferred by reference pixel cache controller 212 via the 24 pixel wide pixel data interface. Therefore, an original 64×32 reference pixel block is split into four 24×40 pixel block transfers.

As shown in row 7 of table 700, a 64×64 original reference pixel block may be divided into four smaller 16×64 reference pixel block units. With an 8-tap interpolation, each 16×64 pixel block unit together with the extra pixels for interpolation become a 24×72 pixel transfer block that is transferred by reference pixel cache controller 212 via the 24 pixel wide pixel data interface. Therefore, an original 64×64 reference pixel block is split into four 24×72 pixel block transfers.

In some embodiments, a client may specify in a read request (e.g., rd_req in FIG. 2) the size of the block that is needed to be transferred (e.g., the block's width and height), the start location, and the horizontal/vertical block split information. FIG. 8 illustrates one exemplary set of parameters that are specified by the client in table 800. In some embodiments, the splitting of a reference pixel block into multiple transfer blocks may be handled by the reference pixel cache controller 212 and the data is returned in multiple transfer cycles as shown in table 700. Reference pixel blocks are split horizontally as downstream engines require data to be processed in a vertical raster scan order. One advantage of splitting a block of pixel data (e.g., 72×72) to multiple overlapping sub blocks (e.g., 24×72 sub blocks) is that the client can process each sub block independently and efficiently, in a pipeline or in parallel, while storing the data only once in a central location.

One of the clients that may request the reference frame data from the DMA controller is motion compensation module 206. Similar to the fractional motion estimation client mentioned above, motion compensation module 206 requires extra pixels for interpolation. One difference between motion compensation module 206 and motion estimation module 202 is that data for the former is processed in transform units (TUs). Therefore, a block of pixels may be split vertically as well depending on the TU size. FIG. 9 illustrates a table 900 showing an example of transferring reference pixel data from a DRAM memory to a motion compensation module via a DMA controller using a unified pixel data interface. The PU size is 64×64, but the TU size is 32×32. The 64×64 block is processed as eight 16×32 blocks. A block of pixels that needs to be transferred (e.g., a prediction unit) is divided into smaller block units that are 16 samples wide, such that a smaller block unit together with the additional samples required for interpolation still fit into the 24 pixel wide pixel data interface. In other words, if a prediction unit has a width that is a multiple of 16 pixels, then the prediction unit is divided horizontally into multiple block units. If the prediction unit has a pixel height that is a multiple of the TU height (e.g., 32 pixels), then the prediction unit is further divided vertically. Each block unit is 16 pixels in width and 32 pixels in height, and each block unit corresponds to one transfer block. Each line of the transfer block includes 16 pixels of the corresponding unit and an additional eight pixels for interpolation. Each column of the transfer block includes 32 pixels of the corresponding unit and eight additional pixels for interpolation. Therefore, each of the eight transfer blocks is 24×40 pixels in size.

In some embodiments, a client may specify in a read request (e.g., rd_req in FIG. 2) whether the reference pixel blocks need to be divided vertically. In some embodiments, the splitting of a reference pixel block into multiple transfer blocks may be handled by the reference pixel cache controller 212 and the data is returned in multiple cycles. One advantage of dividing the reference pixel block vertically is that it is more area efficient for vertical filtering kernels.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory storage;
a cache storage;
a controller configured to:
receive a request that causes transferring of a reference pixel block of a video, wherein the video is being encoded using the system;
determine whether the reference pixel block has at least a portion that is outside a frame of the video; and
in response to the determination of the reference pixel block having at least the portion that is outside the frame of the video:
cause a portion of the reference pixel block of the video inside the frame of the video to be fetched from the memory storage and stored in the cache storage;
pad a remaining missing portion of the reference pixel block of the video outside the frame of the video with padding pixel data to form the reference pixel block; and
transfer the reference pixel block in response to the request, wherein the transferring of the reference pixel block is divided into a plurality of transfer blocks, wherein each transfer block comprises a width and a height, and wherein the width is a predetermined block unit pixel width plus additional pixels for interpolation, and wherein the request is sent to the controller by a client that processes the plurality of transfer blocks independently, and wherein the plurality of transfer blocks comprises overlapping blocks of pixels.

2. The system of claim 1, wherein values of the padding pixel data are determined based on positions of the remaining missing portion relative to the portion of the reference pixel block of the video inside the frame of the video.

3. The system of claim 2, wherein a value of the padding pixel data at a particular pixel location is based on a pixel value of a closest pixel within the portion of the reference pixel block of the video inside the frame of the video.

4. The system of claim 3, wherein a pixel location that is above the frame of the video is padded with a value of a pixel that is in the portion of the reference pixel block of the video inside the frame of the video and directly below the pixel location and on a first line of the portion of the reference pixel block of the video inside the frame of the video.

5. The system of claim 3, wherein a pixel location that is to the right of the frame of the video is padded with a value of a pixel that is in the portion of the reference pixel block of the video inside the frame of the video and is a last right-most pixel on a same horizontal line.

6. The system of claim 3, wherein a pixel location that is below the frame of the video is padded with a value of a pixel that is in the portion of the reference pixel block of the video inside the frame of the video and directly above the pixel location and on a last line of the portion of the reference pixel block of the video inside the frame of the video.

7. The system of claim 3, wherein a pixel location that is to the left of the frame of the video is padded with a value of a pixel that is in the portion of the reference pixel block of the video inside the frame of the video and is a first left-most pixel on a same horizontal line.

8. The system of claim 1, wherein in the event a prediction unit has a width that is a multiple of the predetermined block unit pixel width, the prediction unit is divided horizontally into a plurality of block units, wherein each block unit has the predetermined block unit pixel width, and wherein each block unit corresponds to one of the transfer blocks, and wherein each line of a transfer block includes the pixels in a corresponding line of the corresponding block unit and the additional pixels for interpolation.

9. The system of claim 1, wherein in the event a prediction unit has a width that is a multiple of the predetermined block unit pixel width and a height that is a multiple of a transform unit height, the prediction unit is divided horizontally and vertically into a plurality of block units, and wherein each block unit has the predetermined block unit pixel width and having the transform unit height, and wherein each block unit corresponds to one of the transfer blocks, and wherein each line of a transfer block includes the pixels in a corresponding line of the corresponding block unit and the additional pixels for interpolation, and wherein each column of the transfer block includes a number of pixels of the corresponding block unit and additional pixels for interpolation, wherein the number of pixels equals the transform unit height.

10. A method, comprising:
receiving by a controller a request that causes transferring of a reference pixel block of a video, wherein the video is being encoded using the system;
determining by the controller whether the reference pixel block has at least a portion that is outside a frame of the video; and
in response to the determination of the reference pixel block having at least the portion that is outside the frame of the video:
causing by the controller a portion of the reference pixel block of the video inside the frame of the video to be fetched from a memory storage and stored in a cache storage;
padding by the controller a remaining missing portion of the reference pixel block of the video outside the frame of the video with padding pixel data to form the reference pixel block; and
transferring by the controller the reference pixel block in response to the request, wherein the transferring of the reference pixel block is divided into a plurality of transfer blocks, wherein each transfer block comprises a width and a height, and wherein the width is a predetermined block unit pixel width plus additional pixels for interpolation; and
sending the request by a client to the controller;
processing by the client the plurality of transfer blocks independently, and wherein the plurality of transfer blocks comprises overlapping blocks of pixels.

11. The method of claim 10, wherein values of the padding pixel data are determined based on positions of the remaining missing portion relative to the portion of the reference pixel block of the video inside the frame of the video.

12. The method of claim 11, wherein a value of the padding pixel data at a particular pixel location is based on a pixel value of a closest pixel within the portion of the reference pixel block of the video inside the frame of the video.

13. The method of claim 12, wherein a pixel location that is above the frame of the video is padded with a value of a pixel that is in the portion of the reference pixel block of the video inside the frame of the video and directly below the pixel location and on a first line of the portion of the reference pixel block of the video inside the frame of the video.

14. The method of claim 12, wherein a pixel location that is to the right of the frame of the video is padded with a value of a pixel that is in the portion of the reference pixel block of the video inside the frame of the video and is a last right-most pixel on a same horizontal line.

15. The method of claim 12, wherein a pixel location that is below the frame of the video is padded with a value of a pixel that is in the portion of the reference pixel block of the video inside the frame of the video and directly above the pixel location and on a last line of the portion of the reference pixel block of the video inside the frame of the video.

16. The method of claim 12, wherein a pixel location that is to the left of the frame of the video is padded with a value of a pixel that is in the portion of the reference pixel block of the video inside the frame of the video and is a first left-most pixel on a same horizontal line.

17. A system, comprising:
a controller with a processor configured to:
receive a request that causes transferring of a reference pixel block of a video, wherein the video is being encoded using the system;
determine whether the reference pixel block has at least a portion that is outside a frame of the video; and
in response to the determination of the reference pixel block having at least the portion that is outside the frame of the video:
cause a portion of the reference pixel block of the video inside the frame of the video to be fetched from memory storage and stored in cache storage;
pad a remaining missing portion of the reference pixel block of the video outside the frame of the video with padding pixel data to form the reference pixel block; and
transfer the reference pixel block in response to the request wherein the transferring of the reference pixel block is divided into a plurality of transfer blocks, wherein each transfer block comprises a width and a height, and wherein the width is a predetermined block unit pixel width plus additional pixels for interpolation, and wherein the request is sent to the controller by a client that processes the plurality of transfer blocks independently, and wherein the plurality of transfer blocks comprises overlapping blocks of pixels; and
a memory coupled to the processor and configured to provide the processor with instructions.

18. The system of claim 17, wherein values of the padding pixel data are determined based on positions of the remaining missing portion relative to the portion of the reference pixel block of the video inside the frame of the video.

19. The system of claim 18, wherein a value of the padding pixel data at a particular pixel location is based on a pixel value of a closest pixel within the portion of the reference pixel block of the video inside the frame of the video.

20. The system of claim 19, wherein a pixel location that is above the frame of the video is padded with a value of a pixel that is in the portion of the reference pixel block of the video inside the frame of the video and directly below the pixel location and on a first line of the portion of the reference pixel block of the video inside the frame of the video.

* * * * *